Patented June 17, 1952

2,600,649

UNITED STATES PATENT OFFICE 2,600,649

PROCESS FOR PRODUCING CRYSTAL VIOLET

Ralph Otto Heuse, Wilmington, and Phillip Jerome Wingate, Collins Park, Del., assignors to E. I. du Pont de Nemours & Company, Wilmington, Del., a corporation of Delaware No Drawing. Application March 22, 1951, Serial No. 217,054

5 Claims. (Cl. 260—391)

This invention relates to an improved process for producing crystal violet, and it is the object of this invention to provide a process for improving the qualities of this color, whereby to give it improved copy strength when used in hectograph inks.

Crystal violet (Color Index No. 681) is normally manufactured by the so-called Michler's ketone-zinc chloride process (German Patent 29,943). This involves the reaction of phosgene with an excess of dimethylaniline in the presence of zinc chloride to form Michler's ketone (4,4'-bis-(dimethylamino)benzophenone), then adding phosphorus oxychloride and heating to approximately 100° C. This effects condensation of Michler's ketone with a third molecule of the dimethyl aniline, producing the color in the form of a phosphorus oxychloride complex. The reaction mixture is then drowned in water to hydrolyze off the phosphorus group, and the recovered color is reslurried with water, to give a purer product. The resulting product is now slurried in 95% alcohol and part of the alcohol is distilled off, to yield a crystal violet which contains about 0.5 to 2.0 weight per cent zinc, the amount of zinc being dependent on the thoroughness of the water wash.

Crystal violet is used to a large extent for the manufacture of carbon paper for the spirit-hectograph duplication process. The spirit-hectograph carbon is prepared by incorporating the color into a wax-oil medium and then coating the resulting product on a sized paper. The method of duplication consists of first making a master sheet by typing on glazed paper under which a sheet of spirit-hectograph carbon is placed with the wax side facing up, so that a mirror image of the typed matter is formed on the underside of the master sheet. This master sheet is placed on a revolvable drum in the duplicating machine where it comes in contact with a roller which is moistened with an alcoholic solvent. Prints are formed on the machine by pressing the moistened master sheet against sheets of copy paper. Only a small portion of the dye is removed when each print is made. In many cases, no more than 100 copies are required, and in such cases, it is desirable that a large portion of the dye be removed during the first 100 copies so that these copies will be clear and strong.

Crystal violet as manufactured by the Michler's ketone-zinc chloride method contains some zinc chloride bound to it in complex formation. The quantity is not large, and usually analyzes about 0.5 to 2% zinc by weight; but the product does not have as good spirit duplication properties as crystal violet that is essentially zinc-free. A possible explanation for this difference is that the crystal violet-zinc chloride complex is less soluble in alcohol than crystal violet alone, and consequently not as much of the color is dissolved in the alcohol and subsequently transferred from the master sheet to the copy paper. However, it is difficult and costly to remove the last traces of zinc chloride when crystal violet is manufactured on a commercial scale. The problem, therefore, that has been existing heretofore was to make crystal violet by the Michler's ketone-zinc chloride method, but to impart to it an early spirit duplication strength (that is, maximum strength for the first 100 or so copies) by a simple and inexpensive procedure.

Now we have found that the above problem can be neatly and economically solved by the simple expedient of treating the color with a solution of a water-soluble ferrocyanide, such as potassium ferrocyanide. The quantity of ferrocyanide required is not large, and may be from 0.25 to 1.0 gm.-moles of the ferrocyanide for each gm.-atom of Zn being treated. The latter quantity can be readily calculated from the Zn-analysis of the color and from the weight of color being treated. The treatment generally consists of stirring the color in an aqueous or aqueous-alcoholic solution of the ferrocyanide for about 3 hours or more. The excess liquid is then removed by evaporation, decantation or filtration, and the mass is dried without troubling to remove any water-insoluble by-products which may have resulted from the treatment.

The theory of this treatment is not entirely understood, but without limiting our invention thereto, we venture to suggest that a metathetical reaction apparently takes place, withdrawing zinc from any zinc-chloride-dye complex present in the mass and converting it into a zinc ferrocyanide salt such as $Zn_2Fe(CN)_6$ or possibly $ZnK_2Fe(CN)_6$. In any event, it is remarkable that mere decomposition of the zinc-dye complex, without removing the by-product zinc salts formed, improves the early spirit-hectograph duplicating powers of the colors to the extent observed. This effect is the more surprising, in that we have observed that noticeable improvement is achieved by as low as 0.25 mole of the ferrocyanide for each atomic weight of Zn in the color, whereas theory for complete reaction would require twice that amount. The improvement grows as the proportion of ferrocyanide is increased up to the theoretical 0.5 mole per atom but when this quantity is exceeded, no further discernible increase in duplication strength is observed. Nevertheless, larger quantities may be employed, inasmuch as the excess does no harm and is eliminated in the purification of the crystal violet.

The temperature of treatment is not a material factor, and may vary from room temperature to the boiling point of the mass being treated. The period of stirring is also immaterial except that, in so far as the reaction mixture is a two-phase system, ample time must be assured for any residual solid zinc-color complex to go into solution and be transformed into pure color and zinc ferrocyanide salt. A period of 3 to 16 hours will generally be found satisfactory on a commercial scale.

Without limiting our invention, the following examples will serve to illustrate the same. Parts mentioned are by weight.

Example 1

To 200 parts of crystal violet having a zinc content of 1.2 weight per cent, was added a solution of 7.8 parts of potassium ferrocyanide trihydrate (0.50 mole per atom-weight of zinc) in 100 parts of water and 48 parts of ethyl alcohol. Additional 152 parts of ethyl alcohol were added, and the mixture was stirred at 80° C. until it was of such viscosity that it did not flow (about 3 hrs.). The product was then dried for 16 to 20 hrs. under vacuum at 85°–90° C.

The process resulted in a product which was appreciably superior in spirit duplication strength to untreated crystal violet having a zinc content of but 0.5 weight percent, throughout the 250 copies tested.

Example 2

To 200 parts of crystal violet having a zinc content of 1.25 weight percent in 100 parts of water, was added a solution of 8.5 parts of potassium ferrocyanide trihydrate in 1000 parts of water. The slurry was agitated at room temperature for 16 hours, then cooled to 0–10° C. and filtered. The filter cake was dried at 60° C.; the dry color was mixed with an equal weight of 95% ethyl alcohol, and about 160–170 parts of alcohol were distilled off. The residue was dried in vacuo for 16 hours at 85°–90° C.

The above experiment resulted in a product which was considerably superior, in spirit duplication strength, to untreated crystal violet having a zinc content of 1.25 weight percent, throughout the 250 copies tested.

Example 3

To an aqueous slurry of a mixture of 80 parts of crystal violet having a zinc content of 0.67 weight percent and 70 parts of crystal violet having a zinc content of 1.92 weight percent, in 750 parts of water, was added a solution of 3.2 parts of potassium ferrocyanide trihydrate (0.26 mole per atom-weight of zinc) dissolved in 75 parts of water. The slurry was agitated at room temperature for 16 hours, cooled to 0–10° C., and filtered. The filter cake was dried at 55°–60° C. The dry color was mixed with an equal weight of 95% ethyl alcohol, and approximately 70% of the alcohol was distilled off. The residue was dried in vacuo for 16–20 hours at 85°–90° C.

The above procedure gave a product which was noticeably superior in early spirit duplication strength to untreated crystal violet having a zinc content of 1.25 weight percent.

Example 4

The method of Example 3 was used except that 12.8 parts of potassium ferrocyanide trihydrate were used (1.05 moles per atom-weight of zinc). The procedure gave a product which was noticeably superior to untreated crystal violet having a zinc content of 1.25 weight percent in early spirit duplication strength.

Example 5

An amount of wet crystal violet equivalent to 220 parts of dry color having a zinc content of 0.46 weight percent in 1100 parts of water, was heated to 90–100° C. A solution of 3.7 parts of potassium ferrocyanide trihydrate dissolved in 100 parts of water was added. The slurry was agitated 16 hours at room temperature, cooled to 10° C., and filtered. The filter cake was dried at 60°–70° C. The dry color was mixed with 220 parts of 95% ethyl alcohol and about 75% of the alcohol was then distilled off. The residue was dried in vacuum for 16–20 hours at 85°–90° C.

The procedure resulted in a product that was stronger in early spirit duplication strength than that obtainable by an alcohol treatment of the crystal violet used in this example as starting material.

Example 6

A slurry of 150 parts of crystal violet having a zinc content of 1.78 weight percent, in 750 parts of water, was heated to 90°–100° C. A solution of 9.5 parts of potassium ferrocyanide trihydrate in 100 parts of water was added. The slurry was agitated 16 hours at room temperature, cooled to 10° C., and filtered. The filter cake was dried at 60°–70° C. The dry color was mixed with 150 parts of 95% ethyl alcohol, and approximately 75% of the alcohol was distilled off. The residue was dried 16–20 hours in vacuum at 85°–90° C.

A product resulted which was appreciably stronger in early spirit duplication strength than the crystal violet obtained by alcohol treatment alone.

Example 7

The method of Example 6 was used except that crystal violet having a zinc content of 0.96 weight percent was used, and the quantity of potassium ferrocyanide trihydrate was reduced to 5.1 parts. The procedure resulted in a product which tested appreciably stronger in spirit duplication strength for the first 100 copies than the crystal violet obtained by alcohol treatment alone.

Example 8

To a slurry of a mixture of 100 parts of crystal violet having a zinc content of 1.8 weight percent, and 100 parts of crystal violet having a zinc content of 0.67 weight percent, in 1000 parts of water, was added a solution of 9.2 parts of sodium ferrocyanide decahydrate (0.50 mole per atom-weight of zinc) dissolved in 100 parts of water. The slurry was agitated 16 hours at room temperature, cooled to 0–10° C., and filtered. The filter cake was dried at 60° C. The dry color was mixed with an equal weight of 95% ethyl alcohol and about 75% of the alcohol was distilled off. The residue was dried in vacuum for 16 hours at 85°–90° C.

This procedure gave a product which was superior to the untreated crystal violet used as the starting material, in early spirit duplication strength.

Example 9

The method of Example 8 was used except that 9.7 parts of calcium ferrocyanide $$(Ca_2Fe(CN)_6.12H_2O)$$

(0.50 mole per atom-weight of zinc) dissolved in 160 parts of water was substituted.

A product was obtained which was superior to the untreated crystal violet, in early spirit duplication strength.

It will be understood that the details of procedure may be varied over wide limits without departing from the spirit of this invention.

We claim as our invention:

1. A process for improving the qualities of crystal violet containing a crystal violet-zinc chloride complex as an impurity, which comprises treating the same with a solution of a water-soluble ferro-cyanide whereby to decompose said complex and convert the zinc into a zinc ferrocyanide salt.

2. A process as in claim 1, the quantity of the water-soluble ferrocyanide selected being not less than 0.25 mole weight for each atom-weight of Zn in the color before treatment.

3. A process for improving the qualities of a crystal violet color which is contaminated as a result of its synthesis with a by-product crystal violet-zinc chloride complex, which comprises treating the color with an aqueous solution of a water-soluble ferrocyanide in proportion of from 0.25 to 1.0 mole of said ferrocyanide for each atom-weight of Zn in the color, then filtering off the excess liquid phase, and drying the residual color.

4. A process as in claim 3, the ferrocyanide selected being an alkali-metal ferrocyanide.

5. A process as in claim 3, the ferrocyanide selected being potassium ferrocyanide.

RALPH OTTO HEUSE.
PHILLIP JEROME WINGATE.

REFERENCES CITED

The following references are of record in the file of this patent:

UNITED STATES PATENTS

| Number | Name | Date |
| --- | --- | --- |
| 2,461,896 | Herrick | Feb. 15, 1949 |

OTHER REFERENCES

Clark: Jour. of Physical Chem., vol. 21, pages 776–784 (1917).